(12) United States Patent
Veil (10) Patent No.: US 7,593,205 B2
(45) Date of Patent: Sep. 22, 2009

(54) SAFETY SWITCHING APPARATUS AND METHOD FOR SAFE DISCONNECTION OF A LOAD

(75) Inventor: Richard Veil, Stuttgart (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/004,349

(22) Filed: Dec. 20, 2007

(65) Prior Publication Data

US 2008/0165464 A1 Jul. 10, 2008

Related U.S. Application Data

(63) Continuation of application No. PCT/EP2006/004939, filed on May 24, 2006.

(30) Foreign Application Priority Data

Jun. 21, 2005 (DE) ............... 10 2005 030 276

(51) Int. Cl.
*H02H 7/00* (2006.01)
(52) U.S. Cl. ................................. 361/93.1
(58) Field of Classification Search ............. 361/93.1, 361/115
See application file for complete search history.

(56) References Cited

U.S. PATENT DOCUMENTS 5,471,359 A * 11/1995 Simpson et al. ............ 361/93.2
5,543,997 A    8/1996 Ruprecht
5,734,245 A    3/1998 Terashima et al.
6,591,217 B1   7/2003 Baur et al.
2002/0050933 A1  5/2002 Donat et al.
2002/0180278 A1 12/2002 Veil et al.
2004/0078715 A1  4/2004 Vath
2006/0190101 A1  8/2006 Seizinger

FOREIGN PATENT DOCUMENTS

| DE | 42 42 792 C2 | 6/1994 |
|----|--------------|--------|
| DE | 43 09 789 A1 | 9/1994 |
| DE | 196 40 937 A1 | 4/1998 |
| DE | 199 37 737 A1 | 3/2001 |
| DE | 199 62 497 A1 | 7/2001 |

(Continued)

OTHER PUBLICATIONS

European Standard EN 954-1; 1996; 34 pages.

(Continued)

*Primary Examiner*—Stephen W Jackson
(74) *Attorney, Agent, or Firm*—Harness, Dickey & Pierce, P.L.C.

(57) ABSTRACT

A safety switching apparatus for safe disconnection of a load in an automated installation has at least one input for receiving an analog input signal. It further has an A/D converter which converts the analog input signal to a digital signal. An evaluation and control unit controls at least one output switching element as a function of the digital signal. An analog signal combiner is designed to superimpose an analog test signal on the analog input signal in order to form an analog combination signal. The analog combination signal is supplied to the A/D converter. The operation of the safety switching apparatus can then be monitored for faults by means of the analog test signal.

20 Claims, 3 Drawing Sheets

FOREIGN PATENT DOCUMENTS

| | | |
|---|---|---|
| DE | 100 35 174 A1 | 12/2001 |
| DE | 100 37 737 A1 | 2/2002 |
| DE | 103 20 522 A1 | 11/2004 |
| EP | 1 254 400 B1 | 11/2002 |
| GB | 2 142 206 A | 1/1985 |
| GB | 2 317 969 A | 4/1998 |
| JP | 2003-114266 A | 4/2003 |

OTHER PUBLICATIONS

International Standard IEC 61508-2; First edition May 2000; 145 pages.
International Standard ISO 13849-1; Nov. 2006; 96 pages.

* cited by examiner

SAFETY SWITCHING APPARATUS AND METHOD FOR SAFE DISCONNECTION OF A LOAD

CROSS REFERENCES TO RELATED APPLICATIONS

This application is a continuation of international patent application PCT/EP2006/004939, filed on May 24, 2006 designating the U.S., which international patent application has been published in German language as WO 2006/136260 A1 and claims priority from German patent application DE 10 2005 030 276.9 filed on Jun. 21, 2005. The entire contents of these priority applications are incorporated herein by reference.

BACKGROUND OF THE INVENTION

The present invention relates to a safety switching apparatus and method for safe disconnection of a load in an automated installation. More particularly, the invention relates to a safety switching apparatus and method for receiving and analog signals used for the control of the automated installation.

Automated installations have been increasingly used for many years. This relates to automated installations for the industrial production of goods as well as to automated installations for conveying people or goods, for example conveyor belts at airports or cable cars in skiing resorts. Automated installations are also being increasingly used in theme parks and for building automation. Safety aspects relating to the avoidance of damage or harm to people and objects are playing more and more an important role since, in principle, an automated installation represents a potential risk, either as a result of incorrect operation or as a result of a fault in the operating procedure of the installation. Typical measures for protection of automated installations include setting up protected areas by means of light barriers, light grids, guard fences, etc., and the provision of emergency-off switches which allow safe disconnection of the installation (or of a part of the installation). However, there are applications in which these measures are not suitable, for example when setting up a machine tool for a new production run. In this case, a machine operator has to check the correct supply and processing of a sample workpiece with the guard door open, and may need to intervene in the production process. Setting-up operations such as these are typically carried out at a reduced machine rotation speed, with maintaining the reduced rotation speed representing a safety-relevant process variable.

It is known for safety-relevant process variables such as these to be detected redundantly in order to ensure by means of a plausibility comparison that the process variable has been recorded correctly. A rotation speed sensor of appropriate redundant design is described, for example, in DE 199 37 737 A1. The use of redundant emergency-off switches, guard door switches or light barriers for safety reasons is also known.

These last-mentioned signaling appliances differ from rotation speed sensors and other sensors for recording analog process variables in that they produce only a two-value output signal (emergency-off switch pressed or not pressed, guard door open or closed, light barrier interrupted or not). With two-value signaling appliances such as these, it is possible that the safety-relevant output signal will not change over long time periods, for example because an emergency-off switch is not operated over a period of days or even months, and because a guard door is not opened over a period of hours or days. In order in these situations to ensure that the static signal state at the output of the two-value signaling appliance is not the consequence of a fault, for example the consequence of a line short after crushing of a cable, it is known for the output signals from two-value signaling appliances to have a clock signal applied to them (positive or forced dynamic behavior). A corresponding safety switching apparatus is described, for example, in DE 199 62 497 A1. In the case of the output signals from analog signaling appliances, such as from a rotation speed sensor, this problem does not exist, because the sensor output signal varies continuously. On the other hand, identification of one out of two possible signal states is not the issue here. Rather, the respective instantaneous value of the analog sensor signal is relevant.

When receiving a safety-relevant analog signal, it is therefore (also) necessary to ensure that the circuit components receiving the analog signal are operating correctly. This is particularly true when the analog signal is converted by an A/D converter to a digital signal, which is then supplied to a digital evaluation and control unit for evaluation. For these reasons, DE 100 35 174 A1 proposes to design the input circuit for receiving a single-channel analog signal with two redundant channels, with a test signal in each case being applied alternately to one of the channels, while the other channel is receiving the analog input signal. This makes it possible to identify functional faults in the input circuit of the safety switching apparatus at an early stage. Furthermore, the mutual testing of the redundant input channels allows continuous recording of the analog input signal. This solution has the disadvantage that it is highly complex, since two redundant input channels and a multiplexer for switching between the input signal and the test signal are required even to record a single-channel analog signal.

DE 100 37 737 A1 discloses a method and an apparatus for safe single-channel evaluation of analog sensor signals. This document proposes that two additional redundant signals be produced by addition and subtraction from the two redundant analog signals. The two analog input signals and the two redundant signals are then digitized and are transmitted to an evaluation and control unit. In one exemplary embodiment, they may be transmitted via a single-channel transmission line. This procedure has the disadvantage, however, that two redundant input signals are generally required, and the transmission of a single measured value requires repeated signal conversion (addition, subtraction and digitization).

DE 43 09 789 A1 proposes that a test signal generator be integrated in the analog sensor, in which case the test signal generator may be activated by a higher-level evaluation and control unit. This proposal has the disadvantage that no sensor signals are available while the input circuit of the safety switching apparatus is being checked. Furthermore, this proposal requires specific analog sensors with an integrated test signal generator.

DE 196 40 937 A1 proposes the testing of an A/D converter in the input circuit of a circuit for receiving an analog measurement signal by suppressing the analog measurement signal at times (by grounding it). This procedure again has the disadvantage that the analog input signal is not continuously available for evaluation.

SUMMARY OF THE INVENTION

Against this background, it is an object of the present invention to provide an alternative safety switching apparatus and method, which allow analog input signals to be recorded safely and continuously in an easy and inexpensive manner.

According to one aspect of the invention, there is provided a safety switching apparatus for safe disconnection of a load in an automated installation, comprising at least one input for receiving an analog input signal, an analog signal combiner designed to superimpose an analog test signal on the analog input signal in order to form an analog combination signal, an A/D converter for converting the analog combination signal to a digital signal, an evaluation and control unit to which the digital signal is supplied, and at least one output switching element which is controlled by the evaluation and control unit as a function of the digital signal.

According to another aspect, there is provided a method for safe disconnection of a load in an automated installation, comprising the steps of receiving at least one analog input signal, superimposing an analog test signal on the analog input signal in order to form an analog combination signal, converting the analog combination signal to a digital signal by means of an A/D converter, evaluating the digital signal, and controlling an output switching element as a function of the digital signal for safely disconnecting the load.

The new safety switching apparatus and the new method are thus based on the idea of superimposing an analog test signal on the analog input signal so as to create a combined analog "input signal" which contains both the signal information from the original analog input signal and the signal information from the analog test signal at the same time. The analog combination signal is supplied to the A/D converter and is converted to a digital combination signal. Since the signal information from the two original channels is contained in the digital combination signal, the evaluation and control unit can not only evaluate the original analog input signal but can also check the proper function of the components in the input circuit, in particular the proper function of the A/D converter. The evaluation and control unit only needs to separate the signal components contained in the digital combination signal from one another again, and this can readily be done because of the determined signal combination.

The input circuit of the new safety switching apparatus may therefore be designed with a single channel, although a two-channel embodiment is still possible in order to allow even better fail-safety and, furthermore, greater availability as well. In addition, the new safety switching apparatus can receive and evaluate the analog signals from standard sensors, that is to say there is no need for specific, safe analog sensors. Another particular advantage is that the analog input signal can be monitored and evaluated continuously so that it is possible to react very quickly to a safety-relevant change in the input-side analog signal.

In a preferred refinement, a D/A converter is provided which produces the analog test signal from a digital test signal.

This refinement allows a very simple and flexible implementation since the digital test signal can be separated very easily after analog/digital conversion of the combination signal. Furthermore, a digital test signal can be changed very easily in a digital control unit, thus also allowing the signal parameters of the analog test signal to be matched very easily to a test environment.

In a further preferred refinement, the evaluation and control unit produces the digital test signal and transmits it to the D/A converter.

This refinement is particularly preferred because the evaluation and control unit is in this case always informed about the signal parameters of the test signal that is being used for checking. It can very easily match the test signal to the analog signal or to different requirements. Furthermore, this refinement allows a low-cost implementation.

In a further refinement, the analog signal combiner is an analog adder.

An analog adder can be produced very easily by means of a commercially available operational amplifier. Furthermore, additive superimposition of the analog test signal and the analog input signal has the advantage that subsequent signal separation can be carried out very easily by subtraction. The checking of the components in the input circuit of the new safety switching apparatus can therefore be carried out at very low cost and very quickly without influencing the analog input signal.

In a further refinement, a low-pass filter is provided, which is arranged between the input and the analog signal combiner. The cut-off frequency of this low-pass filter is preferably about 1 kHz.

This refinement is particularly advantageous in conjunction with additive superimposition of the analog input signal and analog test signal. However, it could also be used, for example, for multiplicative superimposition. Since the low-pass filter is located upstream of the analog signal combiner, the analog input signal is limited to a maximum input frequency. However, the test signal which is superimposed only after this may be at a higher frequency. This frequency difference simplifies the subsequent evaluation of the test signal used. In particular, the low-pass filter makes it possible to subtract successive sample values of the combination signal from one another in order to eliminate the signal component from the test signal, since the analog input signal can change only at a limited rate because of the maximum frequency restriction. It is therefore very easily possible to define a maximum permissible difference range for successive sample values.

In a further refinement, the A/D converter has a maximum converter range which is wider than the maximum permissible dynamic range of the analog input signal.

In other words, this refinement includes the idea that the analog input signal does not utilize the conversion range of the A/D converter. This refinement has the advantage that a test signal can then be added to the analog input signal even when the analog input signal has assumed its maximum value. The additive superimposition is therefore possible irrespective of the instantaneous value of the input signal, thus simplifying the evaluation of the two signal components. On the other hand, an additively superimposed test signal makes it possible to test the A/D converter over its entire converter range, thus ensuring that even unexpectedly high amplitude values of the analog input signal are identified reliably.

In a further refinement, the analog test signal is a pulsed signal having pulsed intervals which are greater than the sampling intervals of the A/D converter.

This refinement allows the signal components which have been combined for test purposes to be separated particularly easily since some of the sample values in the combination signal have no superimposed test component because of these time parameters. The test component can therefore be identified by simple subtraction of the successive sample values in the combination signal.

In a further refinement, the evaluation and control unit is designed to compare the successive values of the digital signal with one another and to produce a fault signal if the successive values differ from one another by more than a defined difference value.

This refinement makes use of the capabilities that have already been described. It allows the new method and the new safety switching apparatus to be implemented in a very simple form. Furthermore, the combination signal can be evaluated very quickly in this refinement.

In a further refinement, at least one output is provided which varies as a function of the analog input signal, but is independent of the analog test signal.

In other words, this refinement provides at least one output at which a signal is provided that is not influenced by the superimposed test signal. Preferably, this is a signal, in particular a digital signal, which essentially corresponds to the analog input signal. This refinement allows direct further processing of the analog input signal, such as for closed-loop control purposes. As a result of the new checking of the input circuit, however, the output signal can be processed further as a "safe signal".

In a further refinement, at least two inputs are provided for receiving at least two analog input signals, and at least two analog signal combiners are provided which are designed to superimpose an analog test signal on each of the at least two analog input signals. At least two A/D converters and at least two evaluation and control units (for example a two-channel evaluation and control unit) are also preferably provided, thus forming a signal-processing path with two channels all the way through it.

This refinement allows particularly flexible use of the new safety switching apparatus since, on the one hand, redundant analog signals can be processed and, on the other hand, single-channel analog signals can also be processed, without any change to the safety switching apparatus. In this refinement, the new safety switching apparatus can be matched very flexibly to changing operating environments.

In a further refinement, the evaluation and control unit is designed to evaluate two analog input signals which are inverted with respect to one another.

This refinement is particularly advantageous for applications in which strong electromagnetic interference fields are present. Interference such as this can be eliminated very effectively by evaluation of mutually inverted analog input signals, for example by subtraction. This refinement therefore allows an implementation which has particularly high fail-safety for the reception of analog signals.

In a further refinement, the evaluation and control unit is arranged physically separately from the A/D converter and the analog signal combiner, with an auxiliary control unit being arranged at the output of the A/D converter and communicating with the evaluation and control unit. In one preferred example, the communication takes place over a single-channel transmission path in coded form, such as disclosed by US 2006/0190101 A1 which is incorporated by reference. Alternatively, the communication in other preferred exemplary embodiments takes place over a bus system, such as a CAN bus link.

This refinement simplifies the implementation in installations that are well spread out, and therefore contributes to a reduction in the installation costs. Furthermore, this makes it possible to evaluate a plurality of sensors with analog output signals using one common evaluation and control unit. The latter is also advantageous for a modular design of the safety switching apparatus, in which the individual modules are not at long distances from one another, but can be selectively joined together. In one preferred implementation, the evaluation and control unit is a so-called head module to which a plurality of different I/O modules (input and output modules) can be connected. The input to the A/D converter and the analog signal combiner form a modular input unit in this case.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description and are illustrated in the drawing, in which.

DESCRIPTION OF PREFERRED EMBODIMENTS

Figure 1:
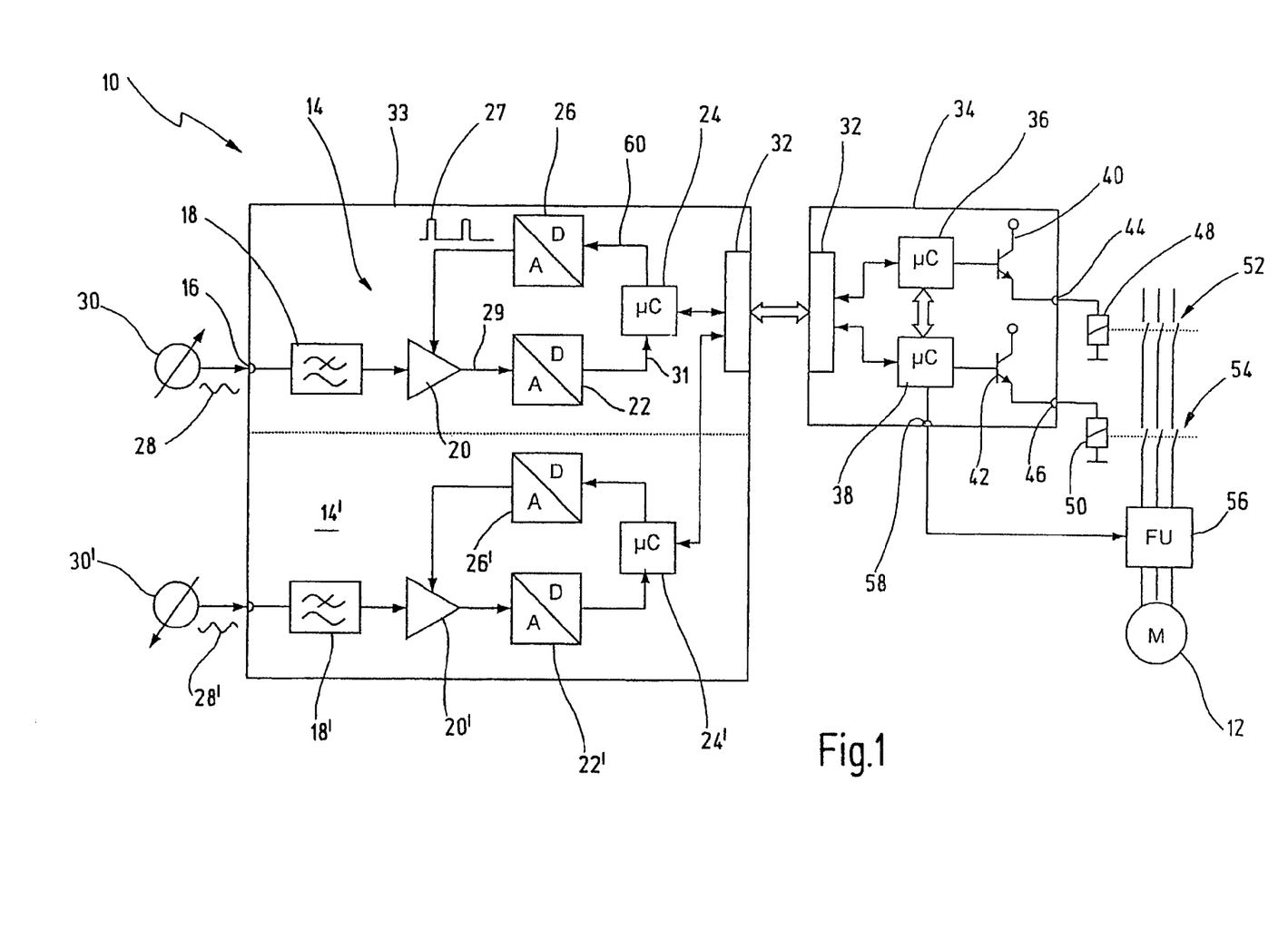
FIG. 1 shows a simplified block diagram in order to explain a first exemplary embodiment of the new safety switching apparatus.

In FIG. 1, an exemplary embodiment of the new safety switching apparatus is annotated in its totality with reference number 10. The safety switching apparatus 10 is used here for safe disconnection of a load in an automated installation. By way of example, a motor 12 is illustrated, which has to be disconnected in a fail-safe form as a function of a sensor signal on the input side. In this context, fail-safe means that the safety switching apparatus 10 must comply at least with the requirements for Category 3 of European Standard EN954-1, or comparable requirements within the meaning of IEC 61508 and/or ISO 13849-1.

The safety switching apparatus 10 comprises an input circuit 14 having an input 16, a low-pass filter 18 connected to the input 16, and a signal combiner connected to the low-pass filter 18. In this case, the signal combiner is in the form of an analog adder circuit or analog adder 20. Analog adders 20 can be produced easily by means of an operational amplifier. Such circuits are fundamental knowledge to a skilled person working in this field, and they are not illustrated in any more detail, for sake of clarity.

The output of adder 20 is connected to an A/D converter 22. The output from the A/D converter 22 leads to a microcontroller 24. Furthermore, microcontroller 24 is connected to a D/A converter 26, which supplies an analog signal 27 to adder 20. The adder 20 superimposes the analog signal 27 and the analog input signal 28, which has been limited by the low-pass filter 18, of an analog sensor 30 connected to the input 16. An analog combination signal 29 is therefore produced at the output of adder 20 and is converted by the A/D converter 22 to a digital combination signal 31. By way of example, the sensor 30 may be a rotation speed sensor, a temperature sensor, a pressure sensor or the like.

The safety switching apparatus 10 is illustrated in FIG. 1 with a second, redundant input circuit 14'. The components in the redundant input circuit 14' are annotated with the same reference numbers as those in the input circuit 14, but marked with a prime in each case. The configuration of the safety switching apparatus 10 with two redundant input circuits 14, 14' offers high flexibility since the two input circuits 14, 14' can selectively be used either redundantly or independently from one another. In principle, the safety switching apparatus 10 may, however, also be produced with just one input circuit 14 and, in consequence, the following text therefore refers only to one input circuit 14.

In the exemplary embodiment having two redundant input circuits 14, 14', it is preferable for the input circuit 14' to be designed to receive an inverted analog input signal 28' from an inverting sensor 30'. The evaluation of the inverted analog input signals 28, 28' makes it possible to easily suppress electromagnetic interference which is superimposed on the input signals 28, 28', by carrying out a subtraction process in the subsequent evaluation and control unit.

Microcontroller 24 is here connected to an interface 32 and communicates via interface 32 with a higher-level (in this case two-channel) evaluation and control unit 34. The evaluation and control unit 34 may be physically remote from the input circuit 14. The interface 32 may be a bus interface, for example based on what is known as SafetyBus®, which has been developed and is being marketed by the proprietor of the present invention. As an alternative to this, a single-channel transmission line can also be used for transmission between the input circuit 14 and the evaluation and control unit 34, as is described in DE 103 20 522 A1. Furthermore, two channels may generally be used for communication purposes, or the evaluation and control unit 34 may form a compact, integrated safety switching device, together with the input circuit 14.

In one particularly preferred embodiment, input 16, signal combiner 20 and A/D converter 22 together with the further elements shown are arranged in a module housing 33 which is connected as an input module to what is known as a head module, with the latter containing the evaluation and control unit 34. The input module 33 and the I/O module 34 then communicate via a "rear-wall bus", for example, onto which the individual modules are plugged. In one exemplary embodiment, the rear-wall bus is based on the CAN bus.

The evaluation and control unit 34 has two-channel redundancy here, as is illustrated in a simplified form by two microcontrollers 36, 38. By way of example, the evaluation and control unit 34 may be a programmable safety controller, as is marketed by the proprietor of the present invention under the brand name PSS®. Alternatively, the evaluation and control unit 34 may be a safety switching device, as is marketed in various variants by the proprietor of the present invention under the brand name PNOZ®, or else it is the already mentioned head module for a modular design.

Each of the two microcontrollers 36, 38 is connected to a respective switching element 40, 42 on the output side in this case. The switching elements 40, 42 each produce an output signal at the outputs 44, 46. In this case, the output signal is shown as an output signal referred to a potential. Alternatively, the output switching elements 40, 42 could, for example, be floating relay contacts.

Two contactors 48, 50 are connected to the outputs 44, 46 of the evaluation and control unit 34. The make contacts 52, 54 of the contactors 48, 50 are connected in series with one another, and in series with the electrical power supply path for the motor 12. Furthermore, a frequency converter 56 is also arranged between the motor 12 and the make contacts 52, 54 of the contactors 48, 50. The frequency converter is 56 is controlled by means of a signal at the output 58 of the evaluation and control unit 34, and it governs the rotation speed of the motor 12 as a function of the input signals 28, 28'. For this purpose, the evaluation and control unit 34 evaluates the analog input signals 28, 28' received by means of the input circuits 14, 14', and produces the actuating signal of the output 58 for the frequency converter 56.

In order to monitor correct operation of the input circuits 14, 14' and in particular of the A/D converters 22, 22', a test signal 27 is superimposed on each of the analog input signals 28, 28', and is evaluated in a manner explained in the following. In one preferred exemplary embodiment the test signal is produced in the form of a digital test signal 60 by the evaluation and control unit 34. The D/A converter converts the digital test signal 60 to an analog test signal 27. The analog test signal 27 is superimposed on the analog input signal 28 (and 28') in the analog adder 20.

The combination signal 29 comprising the analog input signal 28 and the analog test signal 27 is converted by the A/D converter 22 to a digital combination signal 31, and is then preprocessed in the microcontroller 24 such that it can be transmitted via interface 32 to the evaluation and control unit 34. Alternatively, digital test signal 60 could also be produced in the microcontroller 24.

Figure 2:
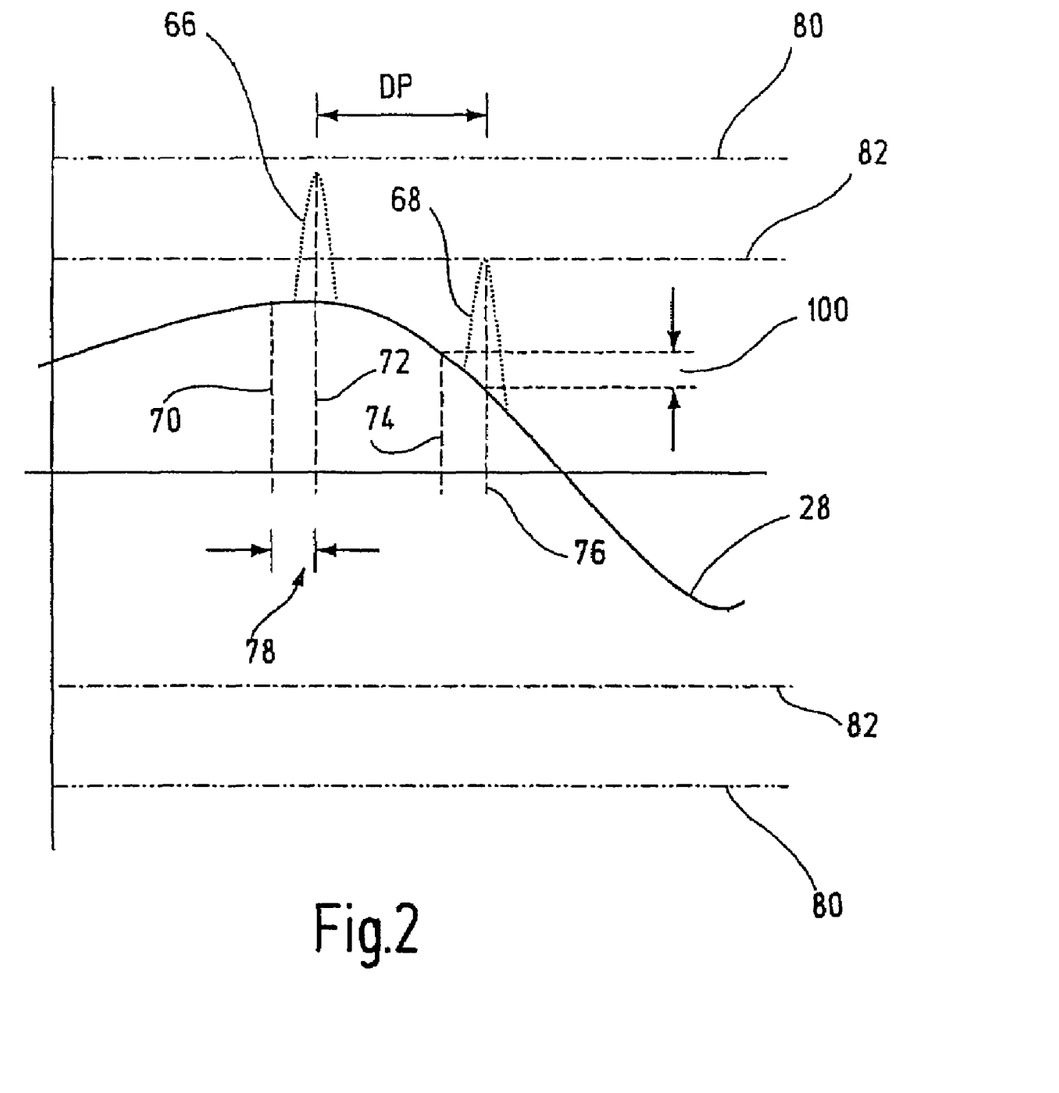
FIG. 2 shows an example of an analog input signal with an analog test signal superimposed.

FIG. 2 shows a detail from the analog input signal 28, on which the analog test signal 27 is superimposed. In this case, the analog test signal 27 contains a plurality of pulses 66, 68, with a pulse distance being annotated as DP. The dashed lines 70, 72, 74, 76 represent sample values of the analog combination signal 29, which the A/D converter 22 receives and converts to digital values. The interval between two sample values, that is to say the sampling interval of the A/D converter 22, is represented by reference number 78.

The lines 80 indicate the upper and lower limit values of the converter range of the A/D converter 22. In contrast, the lines 82 indicate the maximum dynamic range of the input signal 28. As can be seen in FIG. 2, the dynamic range 82 is in this case narrower than the converter range 80 of the A/D converter 22 would allow. Alternatively, the input signal 28 could fully utilize the converter range 80 of the A/D converter 22.

Figure 3:
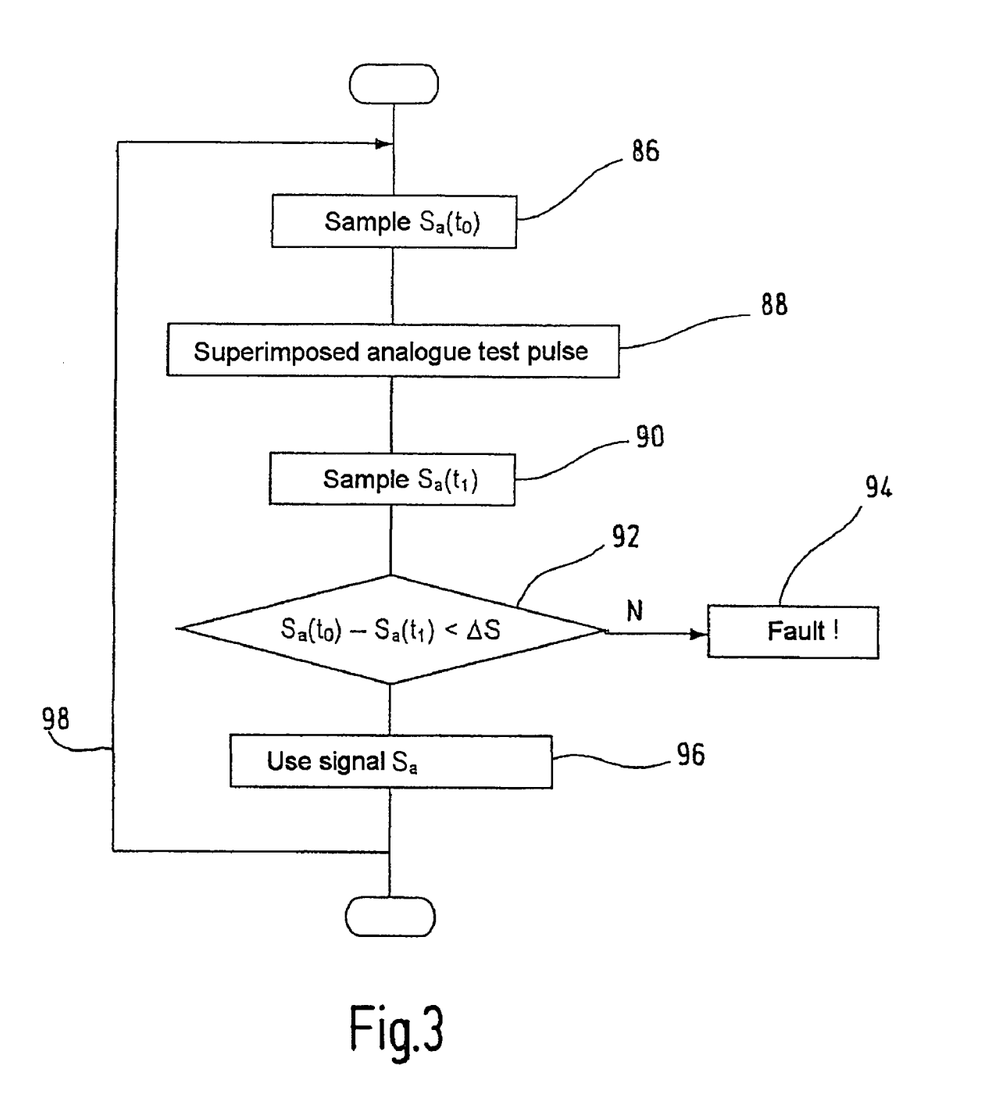
FIG. 3 shows a simplified flowchart in order to explain an embodiment of the new method.

FIG. 3 shows a simplified flowchart of one exemplary embodiment of the new method. In step 86, the combination signal 29 ($S_a$) is sampled at the output of the adder 20. By way of example, the sample value 70 from FIG. 2 is considered here, and it is converted to a digital value. According to step 88, an analog test pulse 66 is superimposed for the next sample value in step 90. The sample value 72 is therefore composed of the instantaneous value of the analog input signal 28 and the instantaneous value of the added test pulse 66. In other words, the sample value 72 ($S_a(t_1)$) in the flowchart in FIG. 3 exceeds the actual analog signal 28 by the instantaneous value of the test pulse 66.

The two successive sample values $S_a(t_0)$ and $S_a(t_1)$ are subtracted from one another in step 92. Furthermore, a check is carried out to determine whether the difference is less than a defined threshold value $\Delta S$. If the magnitude difference is greater than the defined threshold value, then a malfunction has occurred which, according to step 94, triggers a reaction, for example the disconnection of the motor 12. If, in contrast, the magnitude difference is less than the defined threshold value $\Delta S$, the instantaneous value of the combination signal from which the superimposed test pulse 66 has been removed can be used (step 96). Method steps 86 to 96 are repeated iteratively (loop 98).

The method shown in FIG. 3 allows the operation of the input circuit 14 and, in particular, the operation of the A/D converter 22 to be checked, and the analog input signal can be received and processed without any interruption. The situation described with reference to the test pulse 66 is, however, somewhat more difficult when the analog input signal changes between two sample values. This situation is illustrated for the test pulse 68. The subtraction process from step 92 now leads to a relatively large difference $\Delta S$, as is indicated by the reference number 100 in FIG. 2. However, initially, the analog signal 28 can be subject only to a respective signal change from one sample value to the next, because of the low-pass filter 18. If this maximum possible signal change (plus any tolerance supplement) is defined as the maximum permissible threshold value $\Delta S$, the new method provides a reliable statement about the serviceability of the components in the input circuit 14, even in this difficult situation.

In order to test the A/D converter 22 over its entire operating range, a variable test signal is applied via the analog input signal 28 in preferred exemplary embodiments of the invention. The variable test signal may, for example, include test pulses 66, 68 with a different amplitude and/or different mathematical signs. In a relatively simple exemplary embodiment, however, it is also possible to use a test pulse 66, 68 which remains the same. Furthermore, in principle, it is also possible to use an analog signal that is not in the form of a pulse as the test signal, provided that the components of the test signal are known for every sample value. Furthermore, in principle, it is feasible to superimpose the test signal multiplicatively rather than additively, although the subsequent signal separation process is then more complex. In the case of multiplicative superimposition, the signal separation could be carried out by means of a Fourier analysis (not illustrated here).

In particular, the described method can be used to identify code errors and amplification faults in the A/D converter 22. If a variable test signal is used, it is also possible to identify linearity faults in the A/D converter 22. Offset errors in the A/D converter 22 can be identified by briefly disconnecting the analog input signal 28 which can be done, for example, by using a switching element (not illustrated here) arranged upstream from or downstream from the low-pass filter 18.

Since the plausibility of successive sample values is monitored in the method shown in FIG. 3, this method is particularly suitable for a safety switching apparatus 10 which has only one single-channel input circuit 14. Furthermore, in the case of a redundant input circuit 14, a plausibility comparison can also be carried out between the sample values in the two redundant channels, thus allowing increased safety.

Once the superimposed test signal has been "removed" from the sample values 70 to 76 by calculation, the sample values can be used for closed-loop control of the motor 12. For this purpose, the evaluation and control unit 34 shown in FIG. 1 produces an appropriate control signal at the output 58, which control signal varies as a function of the analog input signal 28, but not as a function of the test signal 27. In contrast to this, the switch position of the output switching elements 40, 42 primarily depends on whether the fault monitoring by means of the test signal 27 signals correct operation in the input circuit 14.

In the exemplary embodiment illustrated in FIG. 1, the new safety switching apparatus 10 disconnects the motor in a fail-safe form when the new method identifies a fault condition and/or when the analog signal received at the input 16 overshoots or undershoots a limit value. As an alternative to this, in a preferably redundant implementation, a warning signal can also be produced by means of at least one output switching element, and leads, for example to the recorded analog value not being processed any further. If a second analog channel is available, this input signal can be used on its own for further processing.

What is claimed is:

1. A safety switching apparatus for safe disconnection of a load in an automated installation, comprising
    at least one input for receiving an analog input signal,
    an analog signal combiner designed to superimpose an analog test signal on the analog input signal in order to form an analog combination signal,
    an A/D converter for converting the analog combination signal to a digital signal,
    an evaluation and control unit to which the digital signal is supplied, and
    at least one output switching element which is controlled by the evaluation and control unit as a function of the digital signal.

2. The safety switching apparatus of claim 1, further comprising a D/A converter configured to receive a digital test signal and to generate the analog test signal from the digital test signal.

3. The safety switching apparatus of claim 2, wherein the evaluation and control unit generates the digital test signal and transmits it to the D/A converter.

4. The safety switching apparatus of claim 1, wherein the analog signal combiner is an analog adder.

5. The safety switching apparatus of claim 1, further comprising a low-pass filter arranged between the input and the analog signal combiner.

6. The safety switching apparatus of claim 1, wherein the A/D converter has a maximum converter range, wherein the analog input signal has a maximum dynamic range, and wherein the maximum converter range is wider than the maximum dynamic range.

7. The safety switching apparatus of claim 1, wherein the A/D converter defines a sampling interval, and wherein the analog test signal is a pulsed signal having pulse intervals, with the pulse intervals being greater than the sampling interval.

8. The safety switching apparatus of claim 1, wherein the digital signal comprises a series of successive values, and wherein the evaluation and control unit is designed to compare said successive values with one another and to produce a fault signal when the successive values differ from one another by more than a predefined difference value.

9. The safety switching apparatus of claim 1, further comprising at least one output which varies as a function of the analog input signal, but is independent of the analog test signal.

10. The safety switching apparatus of claim 1, comprising at least two inputs for receiving at least two analog input signals, and comprising at least two analog signal combiners designed to superimpose the analog test signal on each of the at least two analog input signals.

11. The safety switching apparatus of claim 10, wherein the at least two analog input signals are inverted with respect to one another, and the evaluation and control unit is designed to subtract the two analog input signals from each other in order to produce a difference analog input signal for further evaluation.

12. The safety switching apparatus of claim 1, further comprising an auxiliary control unit arranged at the output of the A/D converter and communicating with the evaluation and control unit, wherein the evaluation and control unit is arranged physically separately from the A/D converter and the analog signal combiner.

13. The safety switching apparatus of claim 1, wherein the load comprises a motor which is controlled as a function of the analog input signal.

14. A method for safe disconnection of a load in an automated installation, comprising the steps of
    receiving at least one analog input signal,
    superimposing an analog test signal on the analog input signal in order to form an analog combination signal,
    converting the analog combination signal to a digital signal by means of an A/D converter,
    evaluating the digital signal, and
    controlling an output switching element as a function of the digital signal for safely disconnecting the load.

15. The method of claim 14, wherein the analog signal combiner is an analog adder.

16. The method of claim 14, further comprising a step of low-pass filtering the analog input signal prior to superimposing the analog test signal.

17. The method of claim 14, wherein the A/D converter has a maximum converter range, wherein the analog input signal has a maximum dynamic range, and wherein A/D converter is selected such that the maximum converter range is wider than the maximum dynamic range.

18. The method of claim 14, wherein the A/D converter defines a sampling interval, and wherein the analog test signal is a pulsed signal having pulse intervals, with the pulse intervals being greater than the sampling interval.

19. The method of claim 14, wherein the digital signal comprises a series of successive values, which are compared with one another, and wherein a fault signal is produced when the successive values differ from one another by more than a predefined difference value.

20. The method of claim 14, wherein the load comprises a motor which is controlled as a function of the analog input signal.

* * * * *